(12) United States Patent
Wang et al.

(10) Patent No.: US 10,237,047 B2
(45) Date of Patent: Mar. 19, 2019

(54) FULL DUPLEX COMMUNICATION METHOD AND ASSOCIATED RADIO BASE STATION

(71) Applicant: Telefonaktiebolaget LM Ericsson (publ), Stockholm (SE)

(72) Inventors: Yunfei Wang, Mianyang (CN); Jie Yan, Chengdu (CN); Min Wei, Chengdu (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 242 days.

(21) Appl. No.: 15/021,509

(22) PCT Filed: Sep. 18, 2013

(86) PCT No.: PCT/CN2013/083736
§ 371 (c)(1),
(2) Date: Mar. 11, 2016

(87) PCT Pub. No.: WO2015/039293
PCT Pub. Date: Mar. 26, 2015

(65) Prior Publication Data
US 2016/0234003 A1    Aug. 11, 2016

(51) Int. Cl.
*H04L 5/14* (2006.01)
*H04W 24/02* (2009.01)
(Continued)

(52) U.S. Cl.
CPC .............. *H04L 5/14* (2013.01); *H04L 5/0032* (2013.01); *H04L 5/0073* (2013.01);
(Continued)

(58) Field of Classification Search
CPC ....... H04L 5/14; H04L 5/0032; H04L 5/0073; H04W 24/02; H04W 72/0413; H04W 72/042; H04W 72/0446; H04W 74/04
(Continued)

(56) References Cited

U.S. PATENT DOCUMENTS

2012/0307744 A1* 12/2012 Charbit ............. H04W 72/1205
                                                          370/329
2013/0010619 A1*  1/2013 Fong .................... H04W 74/002
                                                          370/252
(Continued)

FOREIGN PATENT DOCUMENTS

CN        102571313 A      7/2012
CN        103117970 A      5/2013
(Continued)

OTHER PUBLICATIONS

Ericsson, et al., "R1-112923: Applicable scenarios for TDD CA of different UL-DL configurations," 3rd Generation Partnership Project (3GPP), TSG-RAN WG1 #66bis, Oct. 10-14, 2011, 2 pages, Zhuhai, China.
(Continued)

*Primary Examiner* — Ricky Q Ngo
*Assistant Examiner* — Ellen A Kirillova
(74) *Attorney, Agent, or Firm* — Sage Patent Group

(57) ABSTRACT

The present disclosure provides a full duplex communication method implemented by a Radio Base Station (RBS) supporting Time Division Duplex (TDD) scheme and the associated RBS. The method comprises configuring a first logic cell and a second logic cell for the RBS by specifying a first downlink/uplink (DL/UL) configuration corresponding to the first logic cell and a second, different DL/UL configuration corresponding to the second logic cell. The method also comprises transmitting a first wireless signal to
(Continued)

a first UE associated with one of the first and the second logic cells and receiving a second wireless signal from a second UE associated with the other of the first and the second logic cells simultaneously in a subframe, which is allocated for DL communication according to one of the first and the second DL/UL configurations corresponding to the one of the first and the second logic cells and is allocated for UL communication according to the other of the first and the second DL/UL configurations corresponding to the other of the first and the second logic cells. Self-interference suppression is performed to suppress interference from the transmission of the first wireless signal to the reception of the second wireless signal.

12 Claims, 4 Drawing Sheets

(51) Int. Cl.
    *H04W 74/04*     (2009.01)
    *H04L 5/00*     (2006.01)
    *H04W 72/04*     (2009.01)
    *H04W 72/08*     (2009.01)

(52) U.S. Cl.
    CPC ......... *H04W 24/02* (2013.01); *H04W 72/042* (2013.01); *H04W 72/0413* (2013.01); *H04W 72/0446* (2013.01); *H04W 74/04* (2013.01); *H04L 5/001* (2013.01); *H04L 5/0037* (2013.01); *H04W 72/082* (2013.01)

(58) Field of Classification Search
    USPC .......................................................... 370/280
    See application file for complete search history.

(56) References Cited

U.S. PATENT DOCUMENTS

| | | | | |
|---|---|---|---|---|
| 2013/0102319 | A1* | 4/2013 | Yamazaki | H04W 52/243 455/450 |
| 2013/0194981 | A1 | 8/2013 | Wang et al. | |
| 2013/0316710 | A1* | 11/2013 | Maaref | H04W 16/10 455/436 |
| 2013/0322273 | A1* | 12/2013 | Etemad | H04W 24/10 370/252 |
| 2013/0322357 | A1* | 12/2013 | He | H04W 72/0406 370/329 |
| 2014/0321338 | A1 | 10/2014 | Park et al. | |
| 2015/0036566 | A1* | 2/2015 | Blankenship | H04W 52/281 370/311 |

FOREIGN PATENT DOCUMENTS

| | | |
|---|---|---|
| CN | 103166883 A | 6/2013 |
| KR | 20130075620 A | 7/2013 |
| WO | 2012118279 A1 | 9/2012 |
| WO | 2013004283 A1 | 1/2013 |
| WO | 2013100475 A1 | 7/2013 |
| WO | 2013112575 A2 | 8/2013 |

OTHER PUBLICATIONS

Extended European Search Report for European Patent Application No. 13893956.6, dated Apr. 25, 2017, 8 pages.
International Preliminary Report on Patentability for International Patent Application No. PCT/CN2013/083736, dated Mar. 31, 2016, 5 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Technical Specification 36.300, Version 11.3.0, 3GPP Organizational Partners, Sep. 2012, 205 pages.
Bharadia, Dinesh, et al., "Full Duplex Radios," Proceedings of the ACM SIGCOMM 2013 Conference on SIGCOMM, Aug. 12-16, 2013, Hong Kong, China, ACM, 12 pages.
Damnjanovic, Aleksandar, et al., "A Survey on 3GPP Heterogeneous Networks," IEEE Wireless Communications, vol. 18, Issue 3, Jun. 2011, IEEE, pp. 10-21.
Ericsson, et al., "R1-120070: Remaining issues in general frame work for aggregation of carriers with different UL/DL configurations," 3rd Generation Partnership Project (3GPP), TSG-RAN WG1 #68, Feb. 6-10, 2012, 4 pages, Dresden, Germany.
Ghosh, Amitabha, et al., "Heterogeneous Cellular Networks: From Theory to Practice," IEEE Communications Magazine, vol. 50, Issue 6, Jun. 2012, IEEE, pp. 54-64.
International Search Report and Written Opinion for International Patent Application No. PCT/CN2013/083736, dated Jun. 18, 2014, 11 pages.
Chinese First Office Action and Search Report for Application No. 201380079657.5, dated Aug. 15, 2018, 14 pages.

\* cited by examiner

Cell1 – (CFG.2)  | D | S | U | D | D |

Cell2 – (CFG.0)  | D | S | U | U | U |

| Main carrier #1 of Cell1 | Cell1(D) | Cell1(S) | Cell1(U) | Cell1(D) Cell2(U) | Cell1(D) Cell2(U) |
|---|---|---|---|---|---|
| Main carrier #2 of Cell2 | Cell2(D) | Cell2(S) | Cell1(U) | Cell1(D) Cell2(U) | Cell1(D) Cell2(U) |

FULL DUPLEX COMMUNICATION METHOD AND ASSOCIATED RADIO BASE STATION

This application is a 35 U.S.C. § 371 national phase filing of International Application No. PCT/CN2013/083736, filed Sep. 18, 2013, the disclosure of which is incorporated herein by reference in its entirety.

TECHNICAL FIELD

The present disclosure generally relates to the technical field of radio communication systems, and particularly, to a full duplex communication method implemented by a Radio Base Station (RBS) and the associated RBS.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In contrast with Time Division Duplex (TDD)/Frequency Division Duplex (FDD) communications which refer to sending and receiving data at different time/frequency resource elements, full duplex communications refer to sending and receiving data at the same time and frequency resource elements and allow for nearly twice the throughput of TDD/FDD communications.

For a radio communication network, it is particularly desirable to use full duplex RBSs instead of TDD-based or FDD-based RBSs, so that the system throughput of the radio communication network can be increased without deploying additional RBSs or widening the allocated frequency bandwidth.

Although various implementations have been proposed for full duplex radio communications, it is costly and time-consuming for those implementations to be standardized and commercially used due to their incompatibility with existing radio communication standards and facilities.

SUMMARY

In view of the foregoing, an object of the present disclosure is to provide a full duplex solution compatible with existing radio communication standards and facilities, that is, the full duplex solution can be implemented without modifying substantial aspects (e.g., the radio frame structure, the multi-access scheme, etc.) of existing radio communication standards and making existing communication devices (e.g., RBS and user equipment (UE)) completely obsolete.

According to a first aspect of the disclosure, there is provided a full duplex communication method implemented by an RBS supporting Time Division Duplex (TDD) scheme. The method comprises configuring a first logic cell and a second logic cell for the RBS by specifying a first downlink/uplink (DL/UL) configuration corresponding to the first logic cell and a second, different DL/UL configuration corresponding to the second logic cell. The method also comprises transmitting a first wireless signal to a first UE associated with one of the first and the second logic cells and receiving a second wireless signal from a second UE associated with the other of the first and the second logic cells simultaneously in a subframe, which is allocated for DL communication according to one of the first and the second DL/UL configurations corresponding to the one of the first and the second logic cells and is allocated for UL communication according to the other of the first and the second DL/UL configurations corresponding to the other of the first and the second logic cells. Self-interference suppression is performed to suppress interference from the transmission of the first wireless signal to the reception of the second wireless signal.

According to a second aspect of the disclosure, there is provided an RBS. The RBS comprises a logic cell configuration unit, a transceiver and a self-interference suppression unit. The logic cell configuration is arranged to configure a first logic cell and a second logic cell for the RBS by specifying a first DL/UL configuration corresponding to the first logic cell and a second, different DL/UL configuration corresponding to the second logic cell. The transceiver is arranged to transmit a first wireless signal to a first UE associated with one of the first and the second logic cells and receive a second wireless signal from a second UE associated with the other of the first and the second logic cells simultaneously in a subframe, which is allocated for DL communication according to one of the first and the second DL/UL configurations corresponding to the one of the first and the second logic cells and is allocated for UL communication according to the other of the first and the second DL/UL configurations corresponding to the other of the first and the second logic cells. The self-interference suppression unit is arranged to suppress interference from the transmission of the first wireless signal to the reception of the second wireless signal.

According to a third aspect of the disclosure, there is provided an RBS comprising a processor and a memory which stores machine-readable code executable by the processor. When executing the stored machine-readable code, the processor is operative to configure a first logic cell and a second logic cell for the RBS by specifying a first DL/UL configuration corresponding to the first logic cell and a second, different DL/UL configuration corresponding to the second logic cell. Additionally, the processor is operative to generate a first wireless signal to be transmitted to a first UE associated with one of the first and the second logic cells in a subframe, which is allocated for DL communication according to one of the first and the second DL/UL configurations corresponding to the one of the first and the second logic cells and is allocated for UL communication according to the other of the first and the second DL/UL configurations corresponding to the other of the first and the second logic cells. Also, the processor is operative to perform self-interference suppression to suppress interference from the transmission of the first wireless signal to the reception of a second wireless signal from a second UE associated with the other of the first and the second logic cells in the subframe, which is allocated for DL communication according to the one of the first and the second DL/UL configurations corresponding to the one of the first and the second logic cells and is allocated for UL communication according to the other of the first and the second DL/UL configurations corresponding to the other of the first and the second logic cells.

With two different DL/UL configurations specified for the RBS, a radio subframe may be simultaneously assigned for DL and UL communications according to the different DL/UL configurations, thereby providing an opportunity for the RBS to perform duplex communications. Then, by suppressing interference from its DL transmission to its UL reception, the RBS may transmit a DL signal in the radio subframe and meanwhile receive a UL signal with a reasonable signal quality.

Moreover, without modification to the substantial aspects of the existing radio communication standards (particularly, the existing standards for radio communication networks using TDD), configuring two logic cells for the RBS by specifying two corresponding DL/UL configurations enables compatibility with the existing radio communication standards and minimizes software and hardware changes required for updating the existing RBS. Additionally, the proposed solution allows for gradual upgrade of the existing communication facilities, since the updating of only one or a few existing RBSs neither affects normal operations of other existing RBSs nor requires any change of the existing UEs in software or hardware.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Figures 1, 2:
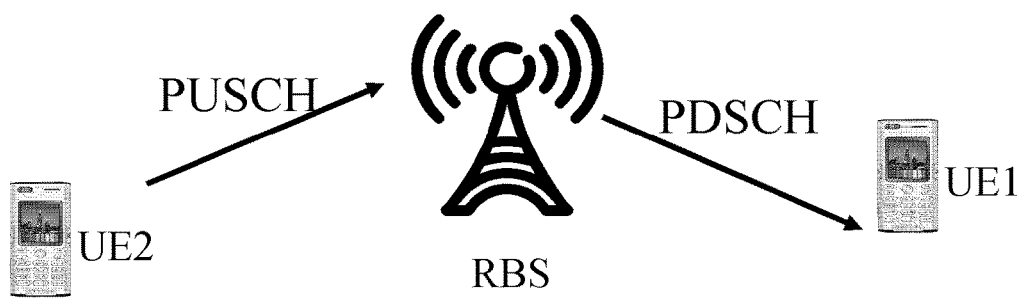
FIG. 1 is a diagram illustrating an example of how an opportunity for an RBS to perform duplex communications may arise by specifying different DL/UL configurations for the RBS.
FIG. 2 is a diagram illustrating an exemplary scenario where an RBS may perform full duplex communications with two UEs.

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc.

Likewise, some or all of the functions may be implemented using software programs and data in conjunction with one or more digital microprocessors or general purpose computers. Where nodes that communicate using the air interface are described, it will be appreciated that those nodes may also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a lo reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology commonly used to describe Long-term Evolution (LTE) technology, as standardized by the Third Generation Partnership Project (3GPP), is used in this disclosure to exemplify the embodiments, this should not be seen as limiting the scope of the techniques to only the aforementioned system. Other wireless systems may also benefit from exploiting the ideas covered within this disclosure. Thus, terms like "eNodeB" and "UE" as used herein should be understood to refer more broadly to RBSs (or radio access nodes) and mobile terminals, respectively, where "mobile terminal" should be understood to encompass end-user and end-application wireless devices such as mobile telephones, smartphones, wireless-enabled tablets or personal computers, wireless machine-to-machine units, and the like. Similarly, while specific channels described in 3GPP standards are referred to herein, the disclosed techniques should be understood as applicable to similar channels in other wireless systems.

Typically, a transmitted signal in a radio communication system is organized in some form of frame structure, or frame configuration. For example, LTE generally uses ten equally sized subframes 0-9 of length 1 ms per radio frame. In case of Time Division Duplex (TDD), there is generally only a single carrier frequency, and UL and DL transmissions are separated in time. Because the same carrier frequency is used for uplink and downlink transmission, both the RBS and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes (e.g., subframe #1 and, in some cases, subframe #6) provide this guard time. A TDD special subframe is generally split into three parts: a downlink part (DwPTS), a guard period (GP), and an uplink part (UpPTS). The remaining subframes are either allocated for UL or DL transmission. Seven different DL/UL configurations provisioned for LTE TDD are shown in Table 1 below, wherein the letter S represents a special subframe, the letter U represents a subframe allocated for UL transmission and the letter D represents a subframe allocated for DL transmission.

TABLE 1

Exemplary DL/UL configurations in TDD.

| DL/UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In current LTE TDD networks, any RBS obeys the rule of adopting only one DL/UL configuration at a time. On the one hand, this rule ensures that a single radio subframe is allocated exclusively for DL or UL transmission, and thus allows for TDD communications at the RBS. On the other hand, as recognized by the inventors, it unfavorably eliminates the opportunity for the RBS to perform full duplex communications.

For an RBS to perform full duplex communication without modifying the substantial aspects (e.g., the radio frame structure, the multi-access scheme, etc.) of the existing LTE TDD communication standards, the present disclosure proposes specifying two different DL/UL configurations for the RBS at a time (that is, breaking the above-described rule to be obeyed by RBSs within TDD networks).

FIG. 1 illustrates an example of how an opportunity for an RBS to perform full duplex communications may arise by specifying DL/UL configuration 2 and DL/UL configuration 0 for the RBS. As will be appreciated by those skilled in the art, the example is given for illustration purpose only, and the opportunity to perform full duplex communications may arise by specifying any other pair of different DL/UL configurations for the RBS.

As shown in FIG. 1, with DL/UL configuration 2 and DL/UL configuration 0 specified for the RBS, two logic cells (logic cell 1 and logic cell 2) are set up for the RBS correspondingly. According to both the DL/UL configuration 2 and the DL/UL configuration 0, the first three subframes are allocated as a DL subframe, a special subframe and a UL subframe, respectively. In contrast, each of the fourth and the fifth subframes is allocated for DL communication according to DL/UL configuration 2, but is allocated for UL communication according to DL/UL configuration 0.

By sufficiently suppressing interference from its DL communication to its UL communication (i.e., the self-interference experienced by the RBS due to reception of unwanted DL signals transmitted by itself in addition to desired UL signals), the RBS may transmit DL traffic data to UE 1 associated with the logic cell 1 via a Physical Downlink Shared CHannel (PDSCH) and meanwhile successfully receive UL traffic data from UE 2 associated with the logic cell 2 via a Physical Uplink Shared CHannel (PUSCH) in the fourth and the fifth subframes, as illustrated in FIG. 2. As such, with minor modifications to its software and hardware, an existing RBS supporting TDD scheme may be updated to support full duplex communications. Moreover, since the updating of only one or a few existing RBSs neither affects normal operations of other existing RBSs nor requires any change of the existing UEs in software or hardware, the proposed solution allows for gradual upgrade of the existing communication facilities.

Figure 3:
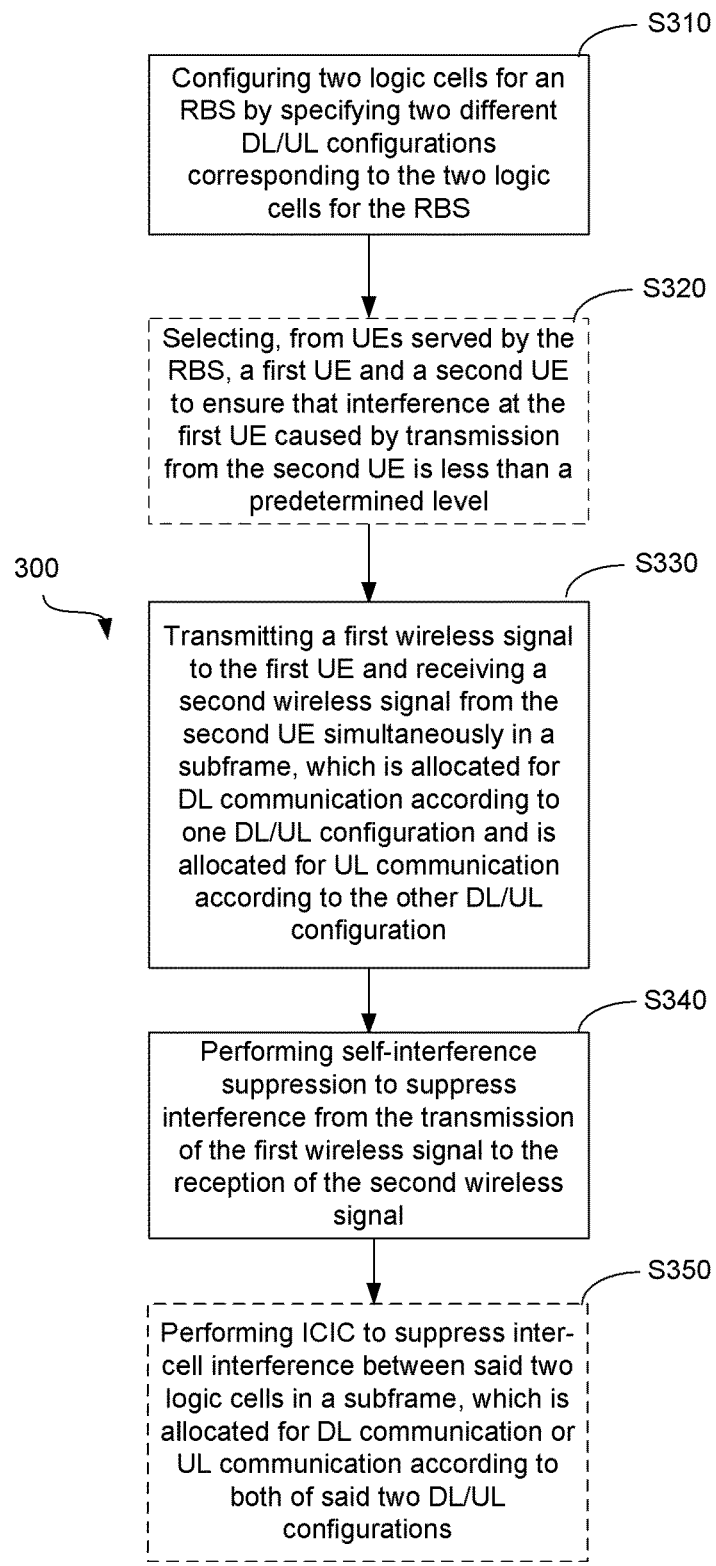
FIG. 3 is a flowchart illustrating a full duplex communication method implemented by an RBS according to an example of the present disclosure.

In the following, an exemplary method based on the above-described inventive concept for an RBS supporting TDD scheme to perform full duplex communications will be described in detail with reference to FIG. 3.

As illustrated, initially, a first logic cell and a second logic cell are configured for the RBS by specifying a first DL/UL configuration corresponding to the first logic cell and a second, different DL/UL configuration corresponding to the second logic cell at block S310. After that, as shown at block S330, the RBS transmits a first wireless signal to a first User Equipment (UE) associated with one of the first and the second logic cells and receives a second wireless signal from a second UE associated with the other of the first and the second logic cells simultaneously (i.e. simultaneously perform DL and UL communications respectively with the first UE and the second UE) in a subframe, which is allocated for DL communication according to one of the first and the second DL/UL configurations corresponding to the one of the first and the second logic cells and is allocated for UL communication according to the other of the first and the second DL/UL configurations corresponding to the other of the first and the second logic cells. Next, at block S340, self-interference suppression is performed to suppress interference from the transmission of the first wireless signal to the reception of the second wireless signal.

As will be appreciated by those skilled in the art, various self-interference suppression approaches already known or to be developed in the future may be applied at block S340. Currently, a self-interference suppression ratio up to 110 dB is available for RBSs operating in certain wireless network environments. This self-interference suppression ratio is good enough for the RBS to successfully decode UL data during full duplex communications.

Although they are logically separated, the first and the second logic cells physically correspond to the same coverage area. Accordingly, DL signals for the first and the second logic cells may be combined and then transmitted by the RBS via the same set of one or more antennas, and UL signals for the first and the second logic cells may be received by the RBS via the same set of one or more antennas.

The first and the second logic cells may have different cell identifications (Cell1_ID and Cell2_ID), so that a UE served by the RBS can identify the logic cells and selectively associate itself to one of the logic cells. For avoiding or at least mitigating interference and/or collision between reference signals required for the two logic cells, a certain relationship may be specified for the logic cells' cell identifications (e.g., Cell1_ID mod 3≠Cell2_ID mod 3).

Optionally, after block S310, the first UE and the second UE may be selected by the RBS from all UEs it serves to ensure that interference at the first UE caused by transmission from the second UE is less than a predetermined level, as shown at block S320.

In an example, various ICIC approaches including but not limited to ABS-based and CCS-based ICIC approaches may be applied to suppress inter-cell interference between the first and the second logic cells in a subframe which is allocated as a DL or UL subframe according to both the first and the second DL/UL configurations (e.g., the first and the third subframes as illustrated in FIG. 1), as illustrated at block S350.

In the following, exemplary procedures of the ABS-based and CCS-based ICIC approaches will be described in detail with respect to FIGS. 4 and 5, respectively.

Figure 4:
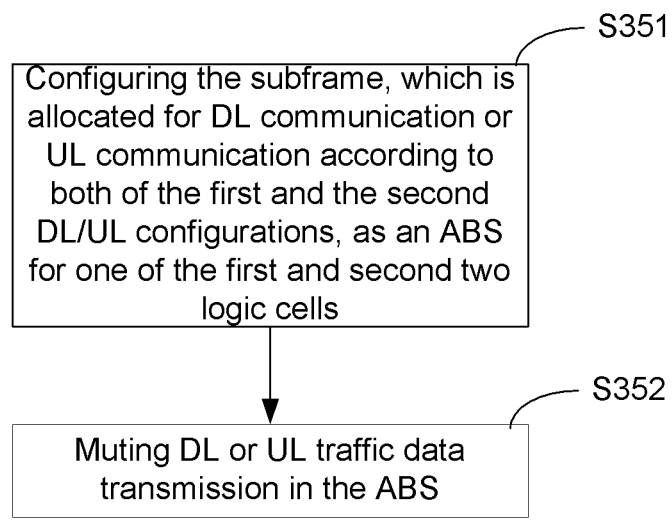
FIG. 4 is a flowchart illustrating a procedure of Absolute Blank Subframe (ABS)-based Inter-Cell Interference Coordination (ICIC) according to an example of the present disclosure.

As illustrated at block S351 in FIG. 4, in the case of ABS-based ICIC, the RBS may initially configure a subframe, which is allocated for DL communication or UL communication according to both of the first and the second DL/UL configurations, as an Almost Blank Subframe (ABS) for the first or the second logic cell. Then, at block S352, the RBS may mute DL or UL traffic data transmission for the first or the second logic cell in the ABS, in order to avoid collision caused by simultaneous DL traffic data transmissions from both of the logic cells.

In this case, only a small amount of overhead information, such as Primary Synchronization Signal (PSS)/Secondary Synchronization Signal (SSS)/Common Reference Symbol (CRS)/Physical Broadcast CHannel (PBCH)/Physical Control Format Indicator CHannel (PCFICH)/Physical Hybrid Automatic Repeat Request Indicator CHannel (PHICH)/System Information Block 1 (SIB1), remains to be transmitted in the ABS for the first or the second logic cells whose DL or UL traffic data transmission is muted. Patterns based on ABSs are signalled to the UE to restrict the UE measurement to specific subframes, called measurement resource restrictions. Since PSS and SSS for the two logic cells are coded using orthogonal codes, there is no problem in decoding them. PBCH is coded at a very low rate, and therefore allows Master Information Block (MIB) to be decoded at a relatively low Signal to Interference plus Noise Ratio (SINR). Through the use of advanced UE cancellation receivers which have been designed to suppress interference caused by overhead information from an interfering cell, the performance of decoding wanted control and data channels can be further improved.

Figure 5:
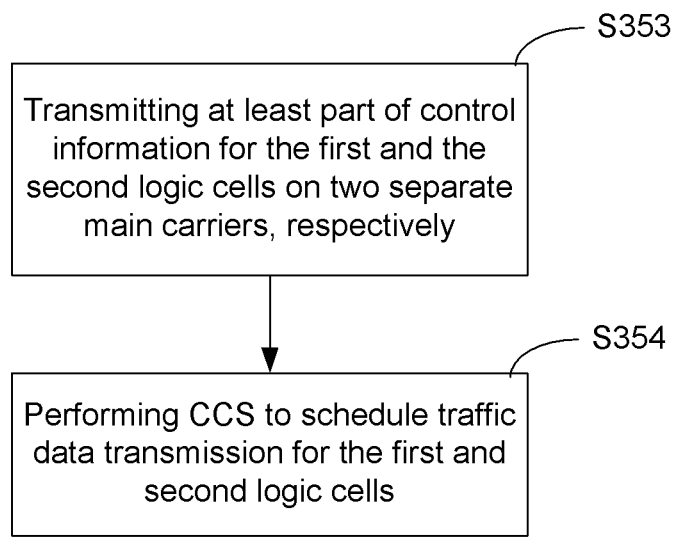
FIG. 5 is a flowchart illustrating a procedure of Cross Carrier Scheduling (CCS)-based ICIC according to an example of the present disclosure.

Referring now to FIG. 5, in the case of CCS-based ICIC, the RBS may use two separate main carriers to transmit at least part of control information (which includes but not limited to fixed-position control information such as PSS/SSS/PBCH/PCFICH/PHICH) respectively for the first and the second logic cells at block S353, and perform CCS to schedule traffic data transmission for the first and the second logic cells at block S354. As such, no collision occurs between control information transmitted for the first and the second logic cells, and radio resources can be scheduled more flexibly for traffic data transmissions.

Figures 6, 7:
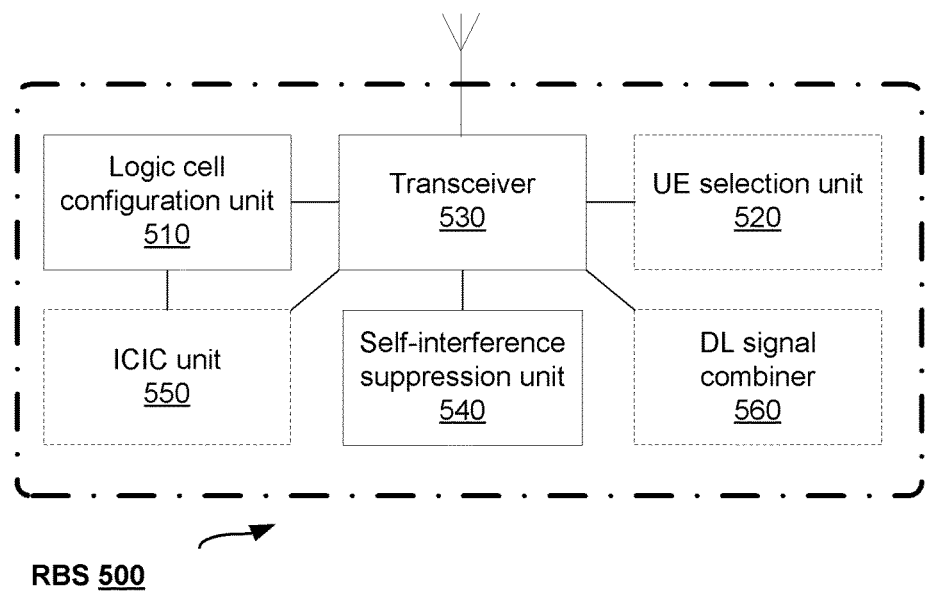
FIG. 6 is a diagram illustrating an example of how to schedule transmissions for two logic cells in a cross carrier manner.
FIG. 7 is a block diagram illustrating a structure of an RBS according to an example of the present disclosure.

An example of how CCS may be performed is shown in FIG. 6. As illustrated, at least part of control information (which includes but not limited to fixed-position control information such as PSS/SSS/PBCH/PCFICH/PHICH) for the first logic cell (denoted as Cell 1) can only be transmitted on a main carrier #1, which however can also be shared by traffic data transmissions for the first and the second logic cells. Likewise, at least part of control information for the second logic cell (denoted as Cell 2) can only be transmitted on a main carrier #2, which however can also be shared by traffic data transmissions for the first and the second logic cells. In the illustration, CCS is performed during the last three subframes. Specifically, for the third subframe, UL traffic data transmission for Cell 1 is scheduled on both the main carrier #1 and the main carrier #2. For the fourth and fifth subframes, DL traffic data transmission for Cell 1 is scheduled on both the main carrier #1 and the main carrier #2, and UL traffic data transmission for Cell 2 is scheduled on both the main carrier #1 and the main carrier #2.

Further details about ABS and CCS may be found in ETSI TS 136 300 V11.3.0 (2012-11), the contents of which are hereby incorporated by reference in its entirety.

In the following, a structure of an RBS 500 according to an example of the present disclosure will be given with reference to FIG. 7.

As shown in FIG. 7, the RBS 500 comprises a logic cell configuration unit 510, a transceiver 530 and a self-interference suppression unit 540. The logic cell configuration unit 510 is arranged to configure a first logic cell and a second logic cell for the RBS by specifying a first downlink/uplink (DL/UL) configuration corresponding to the first logic cell and a second, different DL/UL configuration corresponding to the second logic cell. The transceiver 530 is arranged to transmit a first wireless signal to a first UE associated with one of the first and the second logic cells and receive a second wireless signal from a second UE associated with the other of the first and the second logic cells simultaneously in a subframe, which is allocated for DL communication according to one of the first and the second DL/UL configurations corresponding to the one of the first and the second logic cells and is allocated for UL communication according to the other of the first and the second DL/UL configurations corresponding to the other of the first and the second logic cells. The self-interference suppression unit 540 is arranged to suppress interference from the transmission of the first wireless signal to the reception of the second wireless signal.

In an embodiment, the RBS 500 may further comprise a UE selection unit 520. The UE selection unit 520 may be arranged to select, from UEs served by the RBS, the first UE and the second UE to ensure that interference at the first UE caused by transmission from the second UE is less than a predetermined level.

In an embodiment, the RBS 500 may further comprise an ICIC unit 550. The ICIC unit 550 may be arranged to suppress inter-cell interference between the first and the second logic cells in a subframe, which is allocated for DL communication or UL communication according to both of the first and the second DL/UL configurations.

In an embodiment, the ICIC unit 550 may be further arranged to configure the subframe, which is allocated for DL communication or UL communication according to both of the first and the second DL/UL configurations, as an Almost Blank Subframe (ABS) for one of the first and second two logic cells and to mute DL or UL traffic data transmission in the ABS.

In an embodiment, the first and the second logic cells use two separate main carriers. The ICIC unit 550 may be further arranged to transmit at least part of control information for the first and the second logic cells respectively on said two separate main carriers and to perform CCS to schedule traffic data transmission for the first and the second logic cells.

In an embodiment, the RBS 500 may further comprise a DL signal combiner 560 arranged to combine DL signals for the first and the second logic cells, and the transceiver 530 may be arranged to transmit the combined DL signals via a same set of one or more antennas and to receive UL signals for the first and the second two logic cells via a same set of one or more antennas.

As those skilled in the art will appreciate, the logic cell configuration unit 510, UE selection unit 520, self-interference suppression unit 540 and ICIC unit 550 may be implemented separately as suitable dedicated circuits. Nevertheless, the above-described units can also be implemented using any number of dedicated circuits through functional combination or separation. In some embodiments, the above-described units and the transceiver 520 may be even combined in a single application specific integrated circuit (ASIC).

As an alternative software-based implementation, the RBS may comprise a memory and a processor (including but not limited to a microprocessor, a microcontroller or a Digital Signal Processor (DSP), etc.) The memory stores machine-readable program code executable by the processor.

In such an implementation, when executing the stored machine-readable program code, the processor is operative to configure a first logic cell and a second logic cell for the RBS by specifying a first DL/UL configuration corresponding to the first logic cell and a second, different DL/UL configuration corresponding to the second logic cell. Additionally, the processor is operative to generate a first wireless signal to be transmitted to a first UE associated with one of the first and the second logic cells in a subframe, which is allocated for DL communication according to one of the first and the second DL/UL configurations corresponding to the one of the first and the second logic cells and is allocated for UL communication according to the other of the first and the second DL/UL configurations corresponding to the other of the first and the second logic cells. Also, the processor is operative to perform self-interference suppression to suppress interference from the transmission of the first wireless signal to the reception of a second wireless signal from a second UE associated with the other of the first and the second logic cells in the subframe, which is allocated for DL communication according to the one of the first and the second DL/UL configurations corresponding to the one of the first and the second logic cells and is allocated for UL communication according to the other of the first and the second DL/UL configurations corresponding to the other of the first and the second logic cells.

Likewise, when executing the stored machine-readable program code, the processor may be operative to select the first UE and the second UE from UEs served by the RBS, perform ICIC, combine DL signals for the first and the second logic cells, and so on.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A full duplex communication method implemented by a Radio Base Station (RBS) supporting Time Division Duplex (TDD) scheme, the method comprising:
    configuring a first logic cell and a second logic cell for the RBS by specifying a first TDD downlink/uplink (DL/UL) configuration corresponding to the first logic cell and a second, different TDD DL/UL configuration corresponding to the second logic cell, wherein the first logic cell and the second logic cell physically correspond to same coverage area;
    transmitting a first wireless signal to a first User Equipment (UE) associated with one of the first and the second logic cells and receiving a second wireless signal from a second UE associated with the other of the first and the second logic cells simultaneously in a subframe, which is allocated for DL communication according to one of the first and the second TDD DL/UL configurations corresponding to the one of the first and the second logic cells and is allocated for UL communication according to the other of the first and the second TDD DL/UL configurations corresponding to the other of the first and the second logic cells, wherein the first wireless signal for the first and the second logic cells are combined and then transmitted by the RBS via a same set of one or more antennas, and the second wireless signal for the first and the second logic cells are received by the RBS via a same set of one or more antennas; and
    performing self-interference suppression to suppress interference from the transmission of the first wireless signal to the reception of the second wireless signal.

2. The method of claim 1, further comprising:
    selecting, from UEs served by the RBS, the first UE and the second UE to ensure that interference at the first UE caused by transmission from the second UE is less than a predetermined level.

3. The method of claim 1, further comprising:
    performing Inter-Cell Interference Coordination (ICIC) to suppress inter-cell interference between the first and the second logic cells in a subframe, which is allocated for DL communication or UL communication according to both of the first and the second TDD DL/UL configurations.

4. The method of claim 3, wherein said performing ICIC comprises:
    configuring the subframe, which is allocated for DL communication or UL communication according to both of the first and the second TDD DL/UL configurations, as an Almost Blank Subframe (ABS) for one of the first and second logic cells, and
    muting DL or UL traffic data transmission in the ABS.

5. The method of claim 3, wherein the first and the second logic cells use two separate main carriers, and said performing ICIC comprises:
    transmitting at least part of control information for the first and the second logic cells on said two separate main carriers, respectively, and
    performing cross-carrier scheduling (CCS) to schedule traffic data transmission for the first and the second logic cells.

6. The method of claim 1, wherein the first and the second logic cells have different cell identifications (Cell IDs).

7. A Radio Base Station, RBS, comprising:
    a processor;
    a memory storing machine-readable code that, when executed, cause the processor to:
    configure a first logic cell and a second logic cell for the RBS by specifying a first TDD downlink/uplink (DL/UL) configuration corresponding to the first logic cell and a second, different TDD DL/UL configuration corresponding to the second logic cell, wherein the first logic cell and second logic cell physically correspond to same coverage area;
    transmit a first wireless signal to a first User Equipment (UE) associated with one of the first and the second logic cells and receive a second wireless signal from a second UE associated with the other of the first and the second logic cells simultaneously in a subframe, which is allocated for DL communication according to one of the first and the second TDD DL/UL configurations corresponding to the one of the first and the second logic cells and is allocated for UL communication according to the other of the first and the second TDD DL/UL configurations corresponding to the other of the first and the second logic cells, wherein the first wireless signal for the first and the second logic cells are combined and then transmitted by the RBS via a same set of one or more antennas, and the second wireless signal for the first and the second logic cells are received by the RBS via a same set of one or more antennas; and suppress interference from the transmission of the first wireless signal to the reception of the second wireless signal.

8. The RBS of claim 7, further comprising a UE selection unit arranged to select, from UEs served by the RBS, the first UE and the second UE to ensure that interference at the first UE caused by transmission from the second UE is less than a predetermined level.

9. The RBS of claim 7, further comprising an Inter-Cell Interference Coordination (ICIC) unit arranged to suppress inter-cell interference between the first and the second logic cells in a subframe, which is allocated for DL communication or UL communication according to both of the first and the second TDD DL/UL configurations.

10. The RBS of claim 9, wherein said ICIC unit is further arranged to configure the subframe, which is allocated for DL communication or UL communication according to both of the first and the second TDD DL/UL configurations, as an Almost Blank Subframe (ABS) for one of the first and second two logic cells, and mute DL or UL traffic data transmission in the ABS.

11. The RBS of claim 9, wherein the first and the second logic cells use two separate main carriers, and said ICIC unit is further arranged to transmit at least part of control information for the first and the second logic cells on said two separate main carriers, respectively, and perform cross-carrier scheduling (CCS) to schedule traffic data transmission for the first and the second logic cells.

12. The RBS of claim 7, wherein the first and the second logic cells have different cell identifications (Cell_IDs).

* * * * *